Patented Jan. 29, 1946

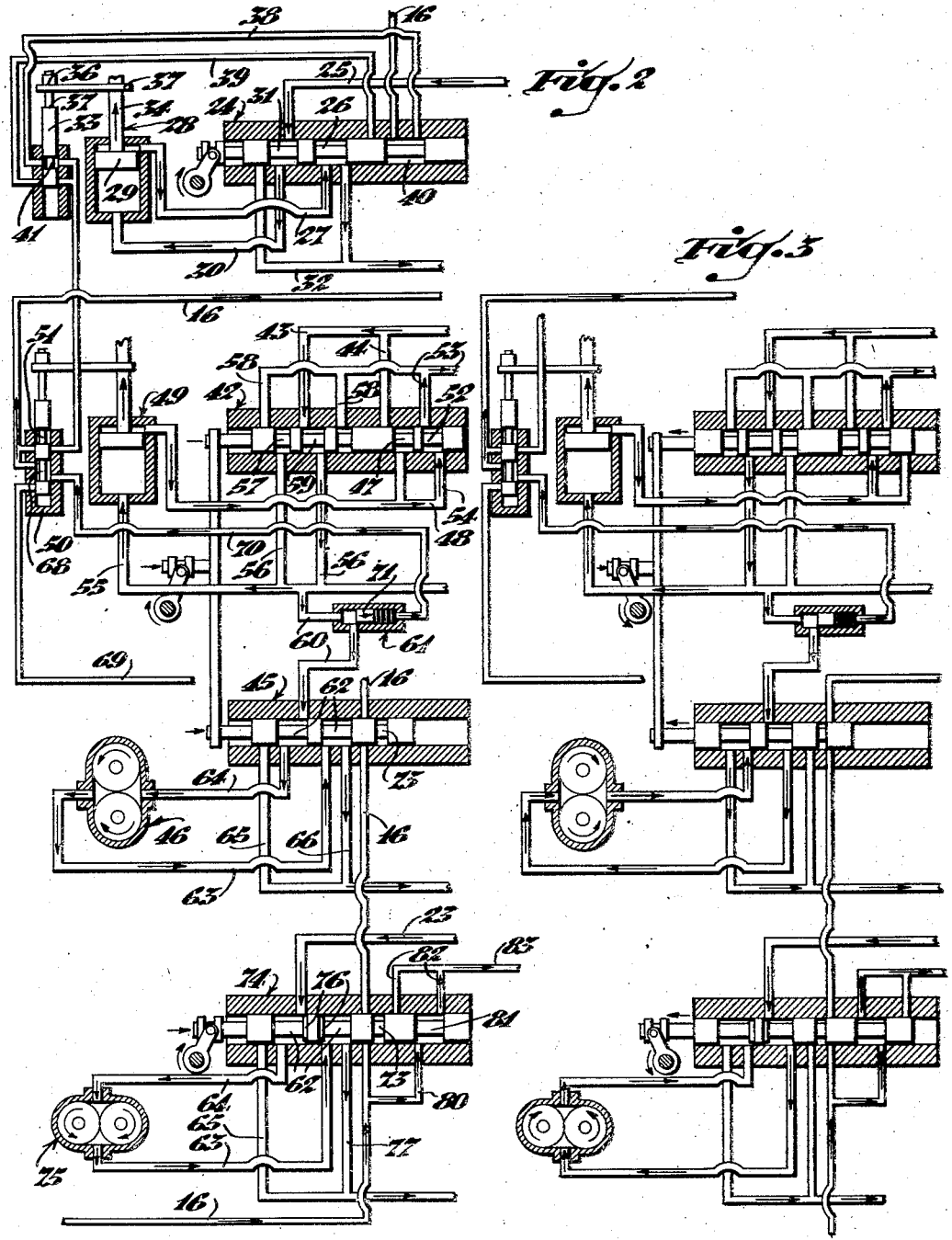

2,393,918

UNITED STATES PATENT OFFICE 2,393,918

HYDRAULIC OPERATING AND CONTROL MECHANISM

Carl E. Linden, Norwood, and Raymond H. McClellan, Hamilton, Ohio, assignors to The Fosdick Machine Tool Company, Cincinnati, Ohio, a corporation of Ohio Application October 13, 1942, Serial No. 461,862

4 Claims. (Cl. 121—40)

This invention relates to hydraulic systems and is particularly directed to a hydraulic system for controlling and operating the moving parts of a machine. The system herein concerned has utility, for example, in controlling and operating the moving parts of a radial drill. In this and analogous environments, hydraulic motors may be utilized for operating the parts.

This application is a continuation-in-part of Carl E. Linden and Raymond H. McClellan patent application entitled "Hydraulic operating and control mechanism," Serial No. 269,188, now abandoned, which was filed April 21, 1939, as a division of a previously filed and co-pending application of the same inventors entitled "Hydraulic operating and control mechanism for machine tools," Serial No. 158,070 filed August 9, 1937, and now issued as United States Patent No. 2,319,551.

In the circuit disclosed, a constant supply of fluid is supplied under pressure. The fluid pump is continuously operated. By means of the continuous operation of the pump, a supply of fluid under pressure is maintained for supplying the control circuit of the system. The operation of the parts, such as the motors and levers, requires a much greater pressure than the operation of the valves of the control. However, if the higher pressure is maintained, the pump is constantly working against the full load. This is, of course, inefficient and places a greater strain on the system. For example, the pressure in the control circuit need be only about 20-25 lbs. per square inch, which is sufficient for operating valves, whereas the pressure in the operating circuit should develop about 600 lbs. per square inch.

Accordingly, the present inventors have provided a hydraulic system for controlling and operating the moving parts of a machine in which the fluid pump is constantly driven and wherein the discharge of the pump is bypassed or returned to the supply, thereby relieving the pump of the strain of operating against substantial head pressure. Toward this end, a secondary control circuit is supplied, altered by the manipulation of any of the control levers of the moving parts, whereby the pump is caused to deliver fluid into the system under pressure sufficient for the operations intended.

The arrangement accomplishing this end includes a relief valve means arranged so that when the pump is operating and none of the control valves have been moved to operative position for any of the mechanisms, the fluid passes two ways from the valve, namely through a bypass and through the secondary or control line. In both instances, it returns to the tank. Thus, the pump is not working against full load unless the mechanism is being operated. The head pressure created is not substantial, since the fluid is moving back into the supply tank under the control circuit pressure of approximately 20-25 lbs. per square inch.

This general arrangement of the hydraulic system simplifies the same and renders it more efficient and less wearing on the parts of the system including the pressure fluid means and the conduits.

In a circuit of this type as applied to a radial drill, for example, it is necessary to provide an intercontrol between certain of the control parts which will delay or prevent the operation of one pending the completion of the operation of the other. Specifically, in the operation of the arm of the radial drill, the arm clamp must be released before the arm elevating motor is operated.

Therefore, it has been the object of the present inventors to provide a system wherein means is included normally blocking the flow of fluid under pressure from the valve controlling the operating means, movement of which is to be delayed until the movement of the first operating means has been consummated.

More specifically, it has been a further object to provide a delaying valve between the control valves actuated automatically for delayed flow to the valve of the control part to be moved last. It has been arranged that the delaying valve will not open until the first control part has fully completed its stroke at which time its valve will open the passageway to the delaying valve, permitting it to move to open position. In other words, the delaying valve is normally held in fully blocked position.

In systems of this type, certain of the devices to be operated do not require and should not be supplied with high pressure fluid, and control of the system for supplying different pressures is important.

Accordingly, it has been a further object of the present inventors to provide a system which will supply fluid at a high pressure, such as 600 lbs. for certain of the devices, but which will permit lowering of the pressure for the operation of other devices. A main relief or unloader valve is provided, set to unload at 600 lbs. A second relief or unloader valve is provided which will unload at 150 lbs., for example. This latter valve is placed in circuit with the vent line of the first unloader valve. The control valve for the lower pressure control means includes passageway arrangements which block passage of fluid through the low pressure unloader valve unless the control valve is moved into its operating position. When thus moved, the vent line is blocked and operating pressure develops. This pressure would develop to 600 lbs. were it not for the fact that the line is then opened through to the low pressure relief valve, bypassing the high pressure relief valve through the control valve.

Other objects and certain advantages will be more fully apparent from a description of the accompanying drawings in which:

Figure 2 is a diagrammatic view illustrating the system but showing the various valves in position for causing operation of the respective control motors; in other words, releasing the clamps moving the arm and traversing the head, and further illustrating the delaying valve in opened position admitting fluid to the arm elevating motor.

Figure 3 is a diagrammatic view of the system showing the various control valves reversed from the positions shown in Figure 2 for drawing the head in a reverse direction and changing the direction of the elevation of the arm.

Figure 1:
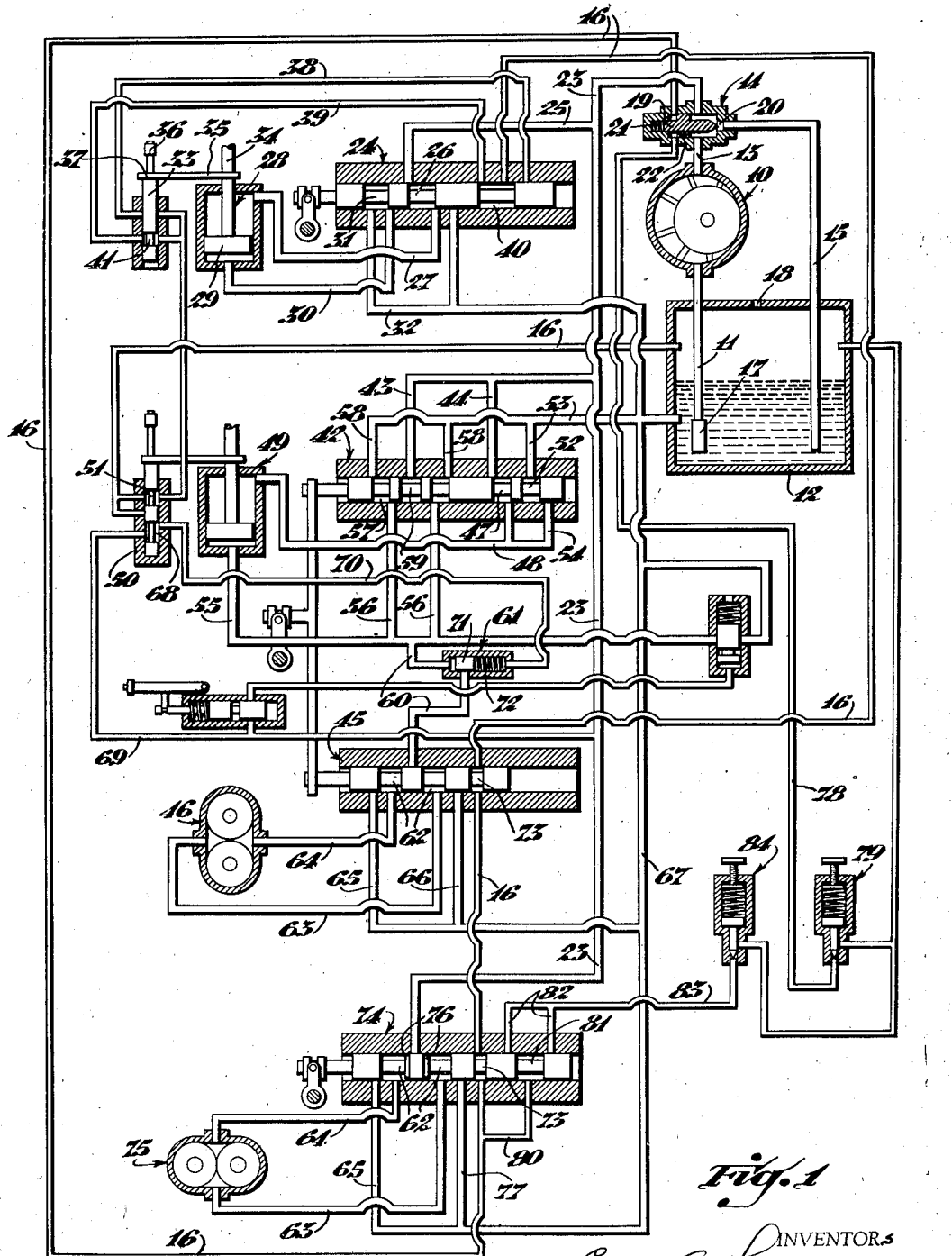
Figure 1 is a diagrammatic view illustrating the system showing the various devices in the circuit for operating certain machine elements as, for example, those of a radial drill such as the column clamp, arm clamp, head traverse and arm elevation, the system being shown in neutral position and the low and high pressure relief valves being shown.

The pump is generally indicated at 10 and is driven from a motor (not shown). The fluid pump may be of any design and includes an intake conduit 11 extending up from the tank 12. A short pipe connection 13 extends from the pump to a control valve 14 which normally, when the system is not in operation, returns the fluid to a tank through the conduit 15. The valve is also effective for directing the fluid through a secondary or vent line 16 incorporated in the system and permitting free circulation when the mechanisms are not being used. This bypass or vent line is automatically closed when the fluid is used for operation and is effective for closing off the return conduit to the tank, thereupon directing the fluid through the system.

Referring to Figure 1 of the drawings, the pump 10 is diagrammatically shown. As stated, the fluid is drawn to a pump through the conduit 11 from the tank 12. The conduit 11 includes a check valve 17 at its lower end. The tank 12 includes a breather opening 18. The relief or bypass valve 14 is in connection with the discharge side of the pump by way of pipe 13. The return pipe or bypass 15 is connected to one end of the valve.

The details of the valve 14 are not fully disclosed, a diagrammatic form of illustration being selected to eliminate the details of this type of valve, which is well known. A floating valve 19 is provided within the relief valve. One end of the valve is adapted to seat over the bypass outlet 20. A coil spring 21 under compression tends to urge the valve toward or against the bypass outlet seat 20. A port 22 extends through the valve from the surface of the reduced portion, entering into the chamber communicating with the vent line 16.

The relief valve control vent line 16 extends from this chamber and passes through the various valves eventually returning to the tank. The arrangement is such that when the pump is operating and none of the valves have been moved to operative position for any of the mechanisms, the fluid passes two ways from the valve, namely, through the bypass 15 and through the secondary control vent pipe 16, in both instances returning to the tank. Thus, the pump is not working against full load, unless the mechanism is being operated, no substantial head pressure being created since the fluid is moving back into the tank under only normal pressure of 20-25 lbs. through the pipe 15. The port 22 is small, being approximately one-sixteenth of an inch in diameter. The vent line or conduit 16 is larger, being approximately one-fourth of an inch in diameter. The fluid passing through the line 16 is under about 20-25 lbs. per square inch. Accordingly, when the supply is not being used, the electric motor is not being loaded unnecessarily and no horsepower is being taken from the drive to the drill.

The relief valve control pipe or conduit 16 has been arranged with respect to the valves so that movement of any one of the valves to a motor operating position will block this line and cause the pressure in the chamber at the back of the valve and the pressure within the main valve chamber or in the pipe 13 to equalize. Thereupon, the spring 21 acts to move the valve across to the seat 20. The fluid then must pass into the main supply pipe 23 leading to the various valves, and the head pressure builds up sufficiently for operating any one of the respective motors.

This main supply line 23 connects to valve 24 which controls, for example, a column clamp motor, through a pipe 25. As shown in Figure 1, the valve 24 is in clamping position. In this position, the fluid passes from the pipe 25 through a groove 26 of the valve to a pipe 27. This latter pipe connects to one end of the column clamp operating motor 28. The piston 29 of the column clamp motor is then forced in column clamping direction.

It will be understood at this point that the column clamp is self-sustaining in each position; that is to say, it is unnecessary to maintain the pressure fluid on either side of the piston 29 to hold the clamp in either clamped or unclamped position. The clamping action has previously occurred and the piston is stationary as shown in Figure 1. In this clamping action, the fluid head is exhausted from the other end of the cylinder through pipe 30, returning to the valve and passing through groove 31, and thence by way of exhaust conduit 32 to the tank.

Associated with the motor 28 is a valve 33. This valve has its stem connected to the piston rod 34 of the motor 28 by means of a bar 35. This bar is free to slide upon the valve stem between the shoulders 36 and 37 thereof. When the motor piston is moved to clamping position, as shown in Figure 1, the valve 33 is shifted in the last phase of the piston movement to the position indicated.

It will be noted that the relief valve control vent conduit 16 extends to the valve 24. It has two exits from the valve, namely, 38 and 39, one at each side of the conduit 16. These conduits extend to the reversing valve 33 and pass through the bore thereof at spaced points joining together to continue the pipe 16 thereafter. The valve 24 includes a groove 40 positioned and of a length for connecting the pipe 16 to either conduit 38 or 39.

In the positions shown, the valve 24 has blocked conduit 16 in the beginning when the groove 41 of the valve 33 has been disposed in position for maintaining the conduit 38 in open condition. When the motor piston 29 moves to clamping position, the groove 41 lines up with the sections of the conduit 39. This control conduit is then uninterrupted, passing through the respective valves by way of groove 40 and groove 41.

The supply pipe 23 extends to the arm clamping valve 42 by way of two conduits, namely, 43 and 44. In Figure 1, the arm clamp is shown in clamped position and, due to the interconnection between the arm clamp valve 42 and the arm elevating motor control valve 45, the control valves maintain the elevating motor 46 in stationary condition. In this position, the arm is clamped since the oil passes to the conduit 44 through the groove 47 of valve 42 and then through conduit 48 to the end of the clamping motor cylinder 49. A control valve 50 for the relief valve control line is associated with the motor 49. This valve is fixed to the piston rod of the motor 49 by means of a bar and must move therewith. In the unclamped position of the arm clamp, the groove 51 of this valve is disaligned from the control pipe 16 where it passes across the bore of the valve. In the clamped position, the groove 51 is aligned with the sections of the pipe 16 and there is no interruption to the flow so that the pump simply bypasses through the conduit 15 back to the tank. This occurs, however, after the clamp has been set.

Due to the fact that the arm clamp is fixed to the elevating mechanism control valve, the valve 42 must have duplicate positions at each side of clamped positions so that unclamping will occur in either direction. Toward this end, a groove 52 is provided, adjacent groove 47, which will exhaust the end of the motor cylinder 49 in the unclamping operation either through conduit 48 through exhaust conduit 53, or through a branch conduit 54 of conduit 48 through exhaust conduit 53.

The arm clamping motor 49 is exhausted in the clamping operation through conduit 55 leading back to the valve 42 through one of the branches 56 by way of groove 57, and thence through either exhaust branch 58 through conduit 53 back to the tank. Duplicate conduits 56—56 are provided at either side of the groove 59 which is in connection with the supply conduit 43. It will be seen that when the valve is either shifted to the right or left, supply conduit 43 is connected to the motor 49 through either of the conduits 56—56 and the unclamping movement of the motor 49 will take place.

Due to the provision of the valves 33 and 50, the pressure does not drop in the system until the motors 28 and 49 have moved to fully clamped or unclamped positions. This is true even though the levers controlling the main valves 24 and 42 of these motors be released to neutral.

The elevating motor control valve 45 receives the fluid supply by way of pipe 60 which includes an unloader valve 61.

The supply line 60 connects to pipe 55 so as to receive the fluid under pressure for the operation of the elevating motor 46 following the arm unclamping movement. Either of the grooves 62 of valve 45 connects the pipe 60 with the motor 46 through pipes 63 or 64 respectively, depending upon the direction of the movement of the elevating motor desired, that is to say, dependent upon the position of its control lever. In the position shown in Figure 1, the motor 46 is at rest since the valve has closed off passage 60. The grooves 62 also connect conduits 63 and 64 alternately to exhaust conduits 65 and 66. Accordingly, when the valve 45 is shifted, let us say to the right, the pipe 60 connects to pipe 64 and the motor is then driven. The fluid continues through conduit 63 and conduit 65, through the exhaust line 67 to the tank.

However, unloader valve 61 will not allow the fluid to pass through the motor 46 until the arm clamping motor has been operated and has released the arm, and a delay is provided preventing operation of the elevating motor until the arm clamping motor has functioned.

To provide this result, the valve 50 has another groove 68. A conduit 69 extends from the supply line 23 normally through this groove 68 by way of a conduit 70 to the end of the delay valve 61 opposite to the connection of the conduit 60. The valve element 71 is engaged against a spring 72. Thus, there is normally a line pressure exerted against the valve 71 preventing it from uncovering the section of conduit 60 leading to the arm elevating motor control valve. However, when the valve 50 is moved to arm unclamping position, this line pressure is blocked and the valve 71 opens easily against the spring to operate the arm elevating motor. The spring 72 provides a resistance or cushion. The oil control conduit 16 passes through valve 45 by way of a groove 73 aligned with the conduit when the valve is in neutral position. This groove is essential since, upon the completion of the arm clamping motor stroke, the control passageway will have been reopened (see Figure 1, groove 51). However, the passage of oil through the control passage is still blocked as long as the elevating motor control valve is in either elevating or lowering position.

The supply pipe 23 is extended to the head traverse control valve 74 which is a duplicate of the elevating motor control valve so that its passageways are numbered in duplicate. The head traverse motor 75 may be operated slowly or rapidly due to the provision of chamfered edges 76 on that portion of the valve which blocks the supply when the valve is in neutral. In other words, by inching the lever, a variable inlet to the valve is effected. This valve 74 includes the same arrangement for controlling the passage of oil through the control pipe 16 so that the valve is effective for blocking this pipe to supply the necessary pressure fluid to the motor 75 when desired.

*Operation of the various motors*

When the column clamp lever is moved to unclamped position, the valve 24 will assume the position shown in Figure 2. Thereupon, the control conduit 16 is blocked from the conduit 39 at the valve. Since the groove 41 is out of line at the beginning of motor operation, pressure is developed. Thereupon, the fluid moves through pipe 25, pipe 30, and the clamp is unclamped. The exhaust takes place through pipe 27, through groove 26 of valve 24, and through exhaust pipe 32 to the tank.

When the column clamp has been unclamped, the flow of oil through the control conduit 16 is re-established through pipe 38, groove 41 of valve 33, groove 51 of valve 50, and thence to the tank.

The next move the operator makes is to move the arm clamp and elevating motor control lever in either direction, dependent upon whether or not the arm is to be raised or lowered. One of these directions is assumed in Figure 2 and the other in Figure 3. Movement of the valve 45 blocks the control conduit 16 since the groove 73 is disaligned. This causes the pump to deliver fluid under pressure through pipe 43, groove 59, through pipe 56, pipe 55 to the motor 49. This moves the motor to unclamping position and the exhaust takes place through conduit 48, branch conduit 54, groove 52 and exhaust pipe 53 back to the tank. As soon as the arm clamping motor has completed its stroke, the unloader valve 61 unseats. The fluid then passes through the elevating motor control valve by way of groove 62, pipe 64, the motor 46, pipe 63, groove 62, exhaust pipe 66, and the main exhaust pipe 67 back to the tank.

As long as the valve is in the position with its groove disaligned from the control conduit 16, operating pressure is available. When the operator stops the elevating motor by shifting the control lever to neutral, the arm clamping valve will be in position for clamping the arm clamp in the final phase. This is possible since the control valve 50 has still blocked the control pipe 16. The head traverse motor may then be operated for moving the head along the arm. This is done by shifting the head traverse control lever in either direction, one direction being shown in Figure 2 and the other in Figure 3. As shown in Figures 2 and 3, the control conduit 16 is blocked upon the movement of the valve and fluid pressure is available passing through line 23, groove 62, conduit 64, the motor 75, conduit 63, other groove 62, exhaust conduit 77, and the main exhaust conduit 67.

By inching the valve through manipulation of the control lever for positioning the chamfered edges 76 of the valve, the speed of movement of the hydraulic motor of the head may be varied.

As explained previously, the system is arranged so that it will normally unload at about 600 lbs. pressure per square inch, which is the correct pressure for operating most of the mechanism. However, in this case, the head traverse motor 75 should only have delivered to it about 150 lbs. per square inch. Thus, the following arrangement has been provided.

An unloader conduit 78 extends to an unloader valve indicated at 79 and the line extends from this unloader valve to the tank. This unloader line extends from the main control valve 14, connecting to it on the same side as the vent line 16. The vent line 16, as stated, is connected through the head traverse valve 74 to a groove 73. A second unloader line 80 extends from this vent line 16 just before it enters the valve 73. This line also enters into the valve 74, particularly a groove 81 therein. Normally, this second unloader line is blocked. Conduits 82 tap into the valve 74 at either side of the groove and extend through a common conduit 83 to an unloader valve 84 which unloads at 150 lbs. per square inch. From this latter unloader valve the line extends to the tank, bypassing the first-named unloader valve. Thus, when the valve for the head traverse motor is moved either way, the second unloader line is connected and no more than 150 lbs. per square inch of pressure can be delivered to the head traverse motor 75.

Figure 4:
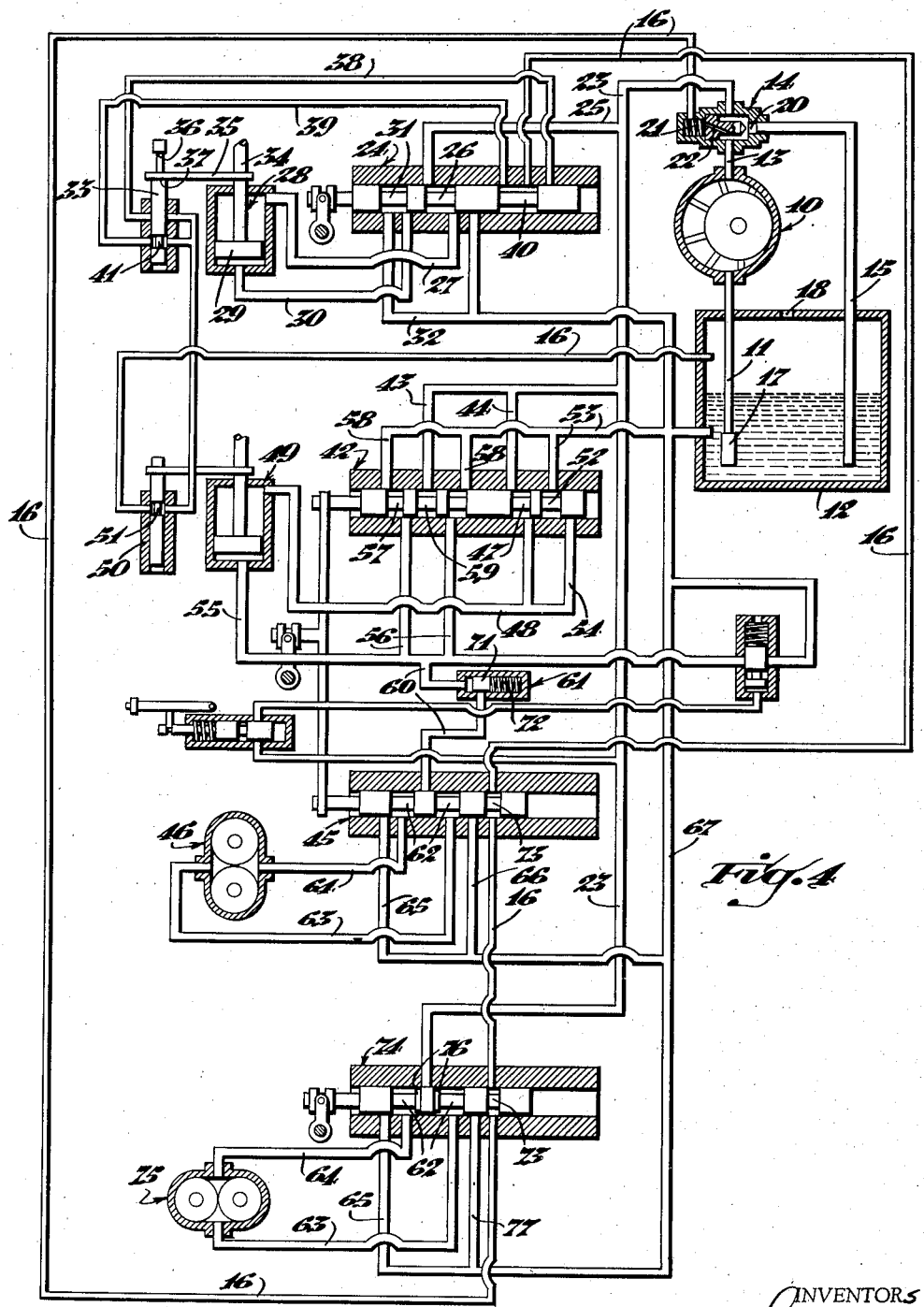
Figure 4 is a diagrammatic view showing the system as previously illustrated in the application and patent referred to above.
Figure 5:
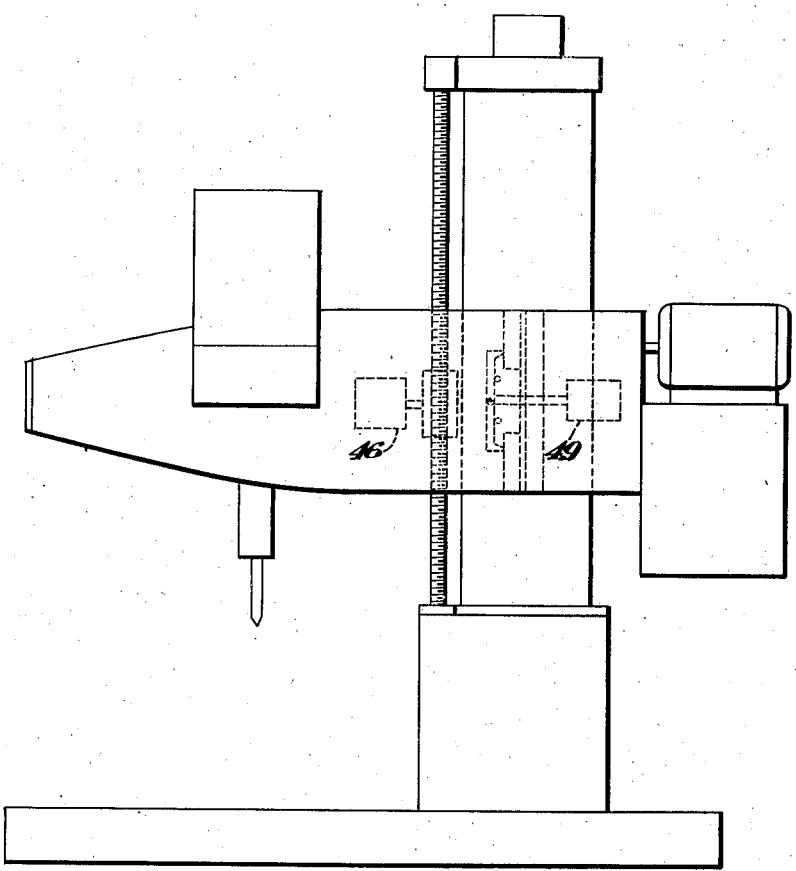
Figure 5 is a diagrammatic view showing a conventional representation of a drill arm and screw and nut elevating means, and also showing the motor for driving the elevating means and the clamp actuating apparatus.

The subject matter illustrated in Figure 4 is the same as that previously described except that the unloader valves 79 and 84 have been added. Also, the delay valve 61 in the disclosure of Figure 4 opens as pressure develops in the arm unclamping motor following completion of the unclamping action, which pressure is sufficient to move the delay valve against its spring and permit the flow of fluid to the valve controlling the arm elevating motor. In other words, in this form the conduit 70 is omitted.

Having described our invention, we claim:

1. A hydraulic system comprising a fluid motor for locking and unlocking an element, a fluid motor for actuating the element, a conduit system including said motors, a source of pressure fluid, respective valves for said locking and actuating motors coupled for coincidental movement to pressure directing and pressure releasing positions, a control valve coupled with said locking motor and pressure responsive valving means in said conduit system normally blocking flow between said respective locking motor and actuating motor valves, but governed by said control valve to permit transference of pressure to said actuating fluid motor after unlocking and before locking of said fluid locking motor in response to pressure transferred to said fluid locking motor from said source, upon actuation of said valves.

2. A hydraulic system including, a fluid motor for locking and unlocking an element of the tool, a fluid motor effective to actuate said element, a source of pressure fluid, a conduit system leading from said source including a valve for said locking motor and a valve for said actuating motor, a control valve operated in unison with said locking motor during at least the last phase of movement thereof, and valving means normally isolating said locking motor and actuating motor valves in said system, the valving means being responsive to pressure in said locking fluid motor and governed by said control valve to permit pressure transfer in said system to said actuating fluid motor in delayed relationship to movement of said locking fluid motor.

3. A hydraulic system comprising a fluid motor for locking and unlocking an element, a fluid motor for actuating the element, a conduit system including said motors, a source of pressure fluid, respective valves for said motors coupled for coincidental movement to pressure directing and pressure releasing positions, and valving means in said conduit system normally blocking flow between said respective valves, a control valve for the locking motor, a conduit extending from the source of pressure fluid through said control valve to the valving means for holding the valving means in position to block the flow of fluid therethrough, said control valve including means effective for blocking the transfer of pressure fluid therethrough to the valving means when the locking motor has been operated to unlocking position whereby fluid may flow through to the valve controlling the actuating motor.

4. A hydraulic system comprising a fluid motor for locking and unlocking an element, a fluid motor for actuating the element, a conduit system including said motors, a source of pressure fluid, respective valves for said locking motor and said actuating motor, said valves being coupled for coincidental movement to pressure directing and pressure releasing positions, a pressure responsive valve interposed between said locking motor valve and said actuating motor valve for normally blocking the flow of pressure fluid from said locking motor valve to said actuating motor valve and a pressure fluid connection from said locking motor to said pressure responsive valve for opening said valve in response to the pressure transferred from the locking motor thereto, whereby said pressure responsive valve permits flow of pressure fluid from said locking motor valve to said actuating motor valve.

CARL E. LINDEN.
RAYMOND H. McCLELLAN.